(12) United States Patent
O'Sullivan et al.

(10) Patent No.: US 9,491,574 B2
(45) Date of Patent: Nov. 8, 2016

(54) USER PATH DETERMINING SYSTEM AND METHOD THEREFOR

(71) Applicant: SITA Information Networking Computing USA, Inc., Atlanta, GA (US)

(72) Inventors: Kevin O'Sullivan, Hove (GB); Stephane Cheikh, Crozet (FR)

(73) Assignee: SITA INFORMATION NETWORKING COMPUTING USA, Inc., Atlanta, GA (US)

( * ) Notice: Subject to any disclaimer, the term of this patent is extended or adjusted under 35 U.S.C. 154(b) by 0 days.

(21) Appl. No.: 13/763,217

(22) Filed: Feb. 8, 2013

(65) Prior Publication Data

US 2013/0210454 A1    Aug. 15, 2013

Related U.S. Application Data

(60) Provisional application No. 61/596,980, filed on Feb. 9, 2012.

(30) Foreign Application Priority Data

Nov. 21, 2012    (GB) .................................. 1220976.3

(51) Int. Cl.
*H04W 24/00* (2009.01)
*H04W 4/02* (2009.01)
(Continued)

(52) U.S. Cl.
CPC ............... *H04W 4/02* (2013.01); *G01S 1/685* (2013.01); *G01S 5/0294* (2013.01); *H04W 4/028* (2013.01); *H04W 4/027* (2013.01); *H04W 40/20* (2013.01); *H04W 64/00* (2013.01)

(58) Field of Classification Search
CPC ... H04W 40/20; H04W 4/027; H04W 4/024; H04W 64/00
USPC .......... 455/404.2, 414.1, 456.1–457
See application file for complete search history.

(56) References Cited

U.S. PATENT DOCUMENTS 4,821,118 A    4/1989    Lafreniere
5,270,921 A    12/1993   Hornick
(Continued)

FOREIGN PATENT DOCUMENTS

AU    2002317935 A1    1/2003
CN    101436185 A      5/2009
(Continued)

OTHER PUBLICATIONS

International Civil Aviation Organization, Machine Readable Travel Documents, Part 1, Machine Readable Passports—vol. 1, Specifications for Electronically Enabled Passports with Biometric Identification Capability, Sixth Edition, 99 pages, 2006.
(Continued)

*Primary Examiner* — Charles Appiah
*Assistant Examiner* — Jaime Holliday
(74) *Attorney, Agent, or Firm* — Morris, Manning & Martin, LLP; Daniel E. Sineway, Esq.; R. Lee Strasburger, Jr., Esq.

(57) ABSTRACT

A system for determining a user's path is described. The system comprises a location server arranged to receive location data of a communication device associated with the user, the location data defining the detected position of the communication device at a number of different points in time, the location server further arranged to receive sequence data associated with the location data indicative of the order in which the location data was determined; path determining means for determining the user's path passing through points defined by the received location data and the associated sequence data; and a comparator for comparing the determined path of the user with one or more predetermined user paths; wherein the location server processes the received location data depending upon the result of the comparison and corrects the determined user path with the processed location data.

36 Claims, 6 Drawing Sheets

(51) Int. Cl.
*G01S 1/68* (2006.01)
*G01S 5/02* (2010.01)
*H04W 40/20* (2009.01)
*H04W 64/00* (2009.01)

(56) References Cited

U.S. PATENT DOCUMENTS

| | | |
|---|---|---|
| 5,918,209 A | 6/1999 | Campbell et al. |
| 6,108,636 A | 8/2000 | Yap et al. |
| 6,112,185 A | 8/2000 | Walker et al. |
| 6,158,658 A | 12/2000 | Barclay |
| 6,192,416 B1 | 2/2001 | Baxter |
| 6,367,016 B1 | 4/2002 | Lambert et al. |
| 6,661,340 B1 | 12/2003 | Saylor et al. |
| 6,695,203 B2 | 2/2004 | Iki et al. |
| 6,757,712 B1 | 6/2004 | Bastian et al. |
| 6,760,778 B1 | 7/2004 | Nelson et al. |
| 6,869,023 B2 | 3/2005 | Hawes et al. |
| 7,035,828 B2 | 4/2006 | Ketonen et al. |
| 7,212,978 B2 | 5/2007 | Kowal et al. |
| 7,258,276 B2 | 8/2007 | Linton et al. |
| 7,327,262 B2 | 2/2008 | Motteram et al. |
| 7,421,319 B2 | 9/2008 | Stefani |
| 7,440,967 B2 | 10/2008 | Chidlovskii |
| 7,454,203 B2 | 11/2008 | Levitan |
| 7,483,696 B1 | 1/2009 | Mitchell |
| 7,486,960 B2 | 2/2009 | Brady et al. |
| 7,539,985 B2 | 5/2009 | Marvin |
| 7,571,206 B2 | 8/2009 | Koning et al. |
| 7,607,080 B2 | 10/2009 | Heuer et al. |
| 7,664,672 B1 | 2/2010 | Walker et al. |
| 7,668,873 B2 | 2/2010 | Davis et al. |
| 7,685,009 B2 | 3/2010 | Halavais et al. |
| 7,702,328 B2 | 4/2010 | Lemond et al. |
| 7,720,724 B2 | 5/2010 | Kurashige |
| 7,739,292 B2 | 6/2010 | Falk et al. |
| 7,786,899 B2 | 8/2010 | Baker et al. |
| 7,805,523 B2 | 9/2010 | Mitchell et al. |
| 7,870,101 B2 | 1/2011 | Hubbard et al. |
| 7,882,137 B2 | 2/2011 | Lepman |
| 7,907,067 B2 | 3/2011 | Baker et al. |
| 7,907,545 B2 | 3/2011 | Ric |
| 7,949,335 B2 | 5/2011 | Stefani et al. |
| 7,954,712 B2 | 6/2011 | Babcock et al. |
| 8,001,519 B2 | 8/2011 | Conallen et al. |
| 8,058,972 B2 | 11/2011 | Mohanty |
| 8,087,583 B2 | 1/2012 | Hawes |
| 8,090,603 B2 | 1/2012 | Payne et al. |
| 8,117,051 B2 | 2/2012 | Sauvage et al. |
| 8,160,759 B2 | 4/2012 | Baker et al. |
| 8,165,809 B1 | 4/2012 | Baker et al. |
| 8,170,535 B1 | 5/2012 | Lopes et al. |
| 8,195,151 B2 | 6/2012 | Cerra, II et al. |
| 8,214,144 B2 | 7/2012 | Baker et al. |
| 8,229,458 B2 * | 7/2012 | Busch .................... 455/456.1 |
| 8,296,281 B2 | 10/2012 | Baker et al. |
| 8,332,136 B2 | 12/2012 | Baker et al. |
| 8,606,508 B2 | 12/2013 | Baker et al. |
| 8,671,009 B1 | 3/2014 | Coley et al. |
| 8,700,236 B1 | 4/2014 | Berman |
| 8,713,661 B2 | 4/2014 | Vysogorets et al. |
| 2002/0138184 A1 | 9/2002 | Kipersztok et al. |
| 2002/0138625 A1 | 9/2002 | Bruner et al. |
| 2002/0160773 A1 | 10/2002 | Gresham et al. |
| 2003/0034390 A1 | 2/2003 | Linton et al. |
| 2003/0048471 A1 | 3/2003 | Lundgren |
| 2003/0093187 A1 | 5/2003 | Walker |
| 2003/0111530 A1 | 6/2003 | Iki et al. |
| 2003/0130769 A1 | 7/2003 | Farley et al. |
| 2003/0146871 A1 | 8/2003 | Karr et al. |
| 2003/0150922 A1 | 8/2003 | Hawes |
| 2003/0220116 A1 | 11/2003 | Sagefalk et al. |
| 2004/0030855 A1 | 2/2004 | Takeuchi et al. |
| 2004/0039617 A1 | 2/2004 | Maycotte et al. |
| 2004/0128193 A1 | 7/2004 | Brice et al. |
| 2004/0249836 A1 | 12/2004 | Reynders et al. |
| 2005/0004919 A1 | 1/2005 | Green et al. |
| 2005/0033666 A1 | 2/2005 | Kurashige |
| 2005/0071206 A1 | 3/2005 | Berge |
| 2005/0228702 A1 | 10/2005 | Fairbanks et al. |
| 2005/0258247 A1 | 11/2005 | Hawes |
| 2006/0004781 A1 | 1/2006 | Burgel et al. |
| 2006/0075934 A1 | 4/2006 | Ram |
| 2006/0085451 A1 | 4/2006 | Pal et al. |
| 2006/0095434 A1 | 5/2006 | McCullough et al. |
| 2006/0097046 A1 | 5/2006 | Baru Fassio et al. |
| 2006/0173680 A1 | 8/2006 | Verhasselt et al. |
| 2006/0206246 A1 | 9/2006 | Walker |
| 2006/0234700 A1 | 10/2006 | Funderburk et al. |
| 2006/0238384 A1 | 10/2006 | Hess et al. |
| 2006/0259456 A1 | 11/2006 | Falk et al. |
| 2006/0277231 A1 | 12/2006 | Kral et al. |
| 2006/0288021 A1 | 12/2006 | Kojima |
| 2007/0055416 A1 | 3/2007 | Allen |
| 2007/0072590 A1 | 3/2007 | Levitan |
| 2007/0111725 A1 | 5/2007 | Kauffman et al. |
| 2007/0127460 A1 | 6/2007 | Wilber et al. |
| 2007/0133487 A1 | 6/2007 | Wang et al. |
| 2007/0149216 A1 | 6/2007 | Misikangas |
| 2007/0157078 A1 | 7/2007 | Anderson |
| 2007/0198314 A1 | 8/2007 | Andrew et al. |
| 2007/0222595 A1 * | 9/2007 | Motteram et al. ......... 340/572.1 |
| 2007/0233617 A1 | 10/2007 | Gillespie |
| 2007/0244766 A1 | 10/2007 | Goel |
| 2007/0250356 A1 | 10/2007 | Douglas |
| 2007/0265881 A1 | 11/2007 | El Eman et al. |
| 2007/0273514 A1 * | 11/2007 | Winand et al. ............ 340/572.1 |
| 2008/0010005 A1 | 1/2008 | Small et al. |
| 2008/0015926 A1 | 1/2008 | Marcken |
| 2008/0027765 A1 | 1/2008 | Gunn et al. |
| 2008/0027955 A1 | 1/2008 | May et al. |
| 2008/0046298 A1 | 2/2008 | Ben-Yehuda et al. |
| 2008/0065480 A1 | 3/2008 | Baker et al. |
| 2008/0070517 A1 | 3/2008 | Brady et al. |
| 2008/0091445 A1 | 4/2008 | Mihic |
| 2008/0099552 A1 | 5/2008 | Grillion |
| 2008/0140226 A1 | 6/2008 | Ganev |
| 2008/0140434 A1 | 6/2008 | O'Brien |
| 2008/0224823 A1 | 9/2008 | Lawson et al. |
| 2008/0229228 A1 | 9/2008 | Cohen |
| 2009/0010200 A1 | 1/2009 | Lauer et al. |
| 2009/0015398 A1 | 1/2009 | Bhogal et al. |
| 2009/0030781 A1 | 1/2009 | Mehta et al. |
| 2009/0033491 A1 | 2/2009 | Saunders |
| 2009/0063219 A1 | 3/2009 | Raufaste et al. |
| 2009/0070841 A1 | 3/2009 | Buga et al. |
| 2009/0081947 A1 | 3/2009 | Margis |
| 2009/0112473 A1 | 4/2009 | Lu et al. |
| 2009/0164500 A1 | 6/2009 | Mathur et al. |
| 2009/0182590 A1 | 7/2009 | Ashby et al. |
| 2009/0187494 A1 | 7/2009 | Heath |
| 2009/0196201 A1 | 8/2009 | Ric |
| 2009/0248457 A1 | 10/2009 | Munter et al. |
| 2009/0256675 A1 | 10/2009 | Kerr |
| 2009/0259549 A1 * | 10/2009 | Winand et al. ............ 705/14.35 |
| 2009/0287513 A1 | 11/2009 | Anderson et al. |
| 2009/0288123 A1 | 11/2009 | Havlovick et al. |
| 2009/0307020 A1 | 12/2009 | Viale et al. |
| 2009/0310530 A1 | 12/2009 | Cerra, II et al. |
| 2009/0313601 A1 | 12/2009 | Baird et al. |
| 2010/0027461 A1 | 2/2010 | Bothorel |
| 2010/0030591 A1 | 2/2010 | Viard et al. |
| 2010/0065632 A1 | 3/2010 | Babcock et al. |
| 2010/0076795 A1 | 3/2010 | Steir et al. |
| 2010/0076826 A1 | 3/2010 | Bayne |
| 2010/0078475 A1 | 4/2010 | Lin et al. |
| 2010/0102934 A1 | 4/2010 | Guichard |
| 2010/0159871 A1 | 6/2010 | Tester |
| 2010/0190510 A1 | 7/2010 | Maranhas et al. |
| 2010/0191782 A1 | 7/2010 | Brzozowski |
| 2010/0197318 A1 | 8/2010 | Petersen et al. |
| 2010/0198628 A1 | 8/2010 | Rayner |
| 2010/0205448 A1 | 8/2010 | Tarhan et al. |
| 2010/0245034 A1 | 9/2010 | D'Oliveiro et al. |

(56) References Cited

U.S. PATENT DOCUMENTS

| | | |
|---|---|---|
| 2010/0268656 A1 | 10/2010 | Teicher |
| 2010/0332358 A1 | 12/2010 | Owens |
| 2011/0004832 A1 | 1/2011 | Canal et al. |
| 2011/0018769 A1* | 1/2011 | Misikangas et al. ......... 342/451 |
| 2011/0028160 A1* | 2/2011 | Roeding et al. ........... 455/456.1 |
| 2011/0119183 A1 | 5/2011 | Berman |
| 2011/0227737 A1 | 9/2011 | Kamins |
| 2012/0035965 A1 | 2/2012 | Maguire et al. |
| 2012/0042263 A1 | 2/2012 | Rapaport et al. |
| 2012/0075168 A1 | 3/2012 | Osterhout et al. |
| 2012/0129546 A1* | 5/2012 | Yang et al. ................ 455/456.1 |
| 2012/0200390 A1 | 8/2012 | Saravanan |
| 2012/0203578 A1 | 8/2012 | Baggett et al. |
| 2012/0284108 A1 | 11/2012 | Fontana et al. |
| 2013/0069985 A1 | 3/2013 | Wong et al. |
| 2013/0141313 A1 | 6/2013 | Zhou et al. |
| 2013/0211864 A1 | 8/2013 | Sanderson et al. |
| 2013/0234849 A1 | 9/2013 | Gupta et al. |
| 2013/0267255 A1* | 10/2013 | Liu et al. .................... 455/456.3 |
| 2013/0295966 A1* | 11/2013 | Dingler et al. ............. 455/456.3 |
| 2013/0297103 A1 | 11/2013 | Baker et al. |
| 2013/0314257 A1 | 11/2013 | Macrae et al. |
| 2013/0325526 A1 | 12/2013 | Tyler |
| 2014/0006070 A1 | 1/2014 | Stamler |
| 2014/0039717 A1 | 2/2014 | Henkel |
| 2014/0052482 A1 | 2/2014 | Le Marier et al. |
| 2014/0067244 A1 | 3/2014 | Baker et al. |
| 2014/0075506 A1 | 3/2014 | Davis et al. |
| 2014/0123315 A1 | 5/2014 | Baker et al. |
| 2014/0188311 A1 | 7/2014 | Masson |

FOREIGN PATENT DOCUMENTS

| | | |
|---|---|---|
| DE | 10357831 A1 | 7/2005 |
| EP | 1318463 A1 | 6/2003 |
| EP | 1454306 A2 | 9/2004 |
| EP | 1 610 094 A1 | 12/2005 |
| EP | 1679624 A2 | 7/2006 |
| EP | 2088543 A1 | 8/2009 |
| EP | 2088569 A1 | 8/2009 |
| EP | 2 222 053 A1 | 8/2010 |
| EP | 1 874 001 B1 | 10/2010 |
| EP | 2290600 A2 | 3/2011 |
| EP | 2362354 A2 | 8/2011 |
| EP | 2390845 A1 | 11/2011 |
| EP | 2474931 A1 | 7/2012 |
| GB | 2366945 A | 3/2002 |
| GB | 2408131 B1 | 3/2006 |
| GB | 2418511 A | 3/2006 |
| GB | 2469026 A | 10/2010 |
| GB | 2470897 A | 12/2010 |
| JP | 2005135199 A | 5/2005 |
| JP | 2006053724 A | 2/2006 |
| JP | 2008117340 A | 5/2008 |
| JP | 2008171181 A | 7/2008 |
| JP | 2009093603 A | 4/2009 |
| WO | 0073954 A2 | 12/2000 |
| WO | 0135269 A2 | 5/2001 |
| WO | 0135289 A1 | 5/2001 |
| WO | 0157323 A1 | 8/2001 |
| WO | 02/15582 A1 | 2/2002 |
| WO | 03005237 A1 | 1/2003 |
| WO | 2004045106 A1 | 5/2004 |
| WO | 2006010774 A1 | 2/2006 |
| WO | 2008055181 A2 | 5/2008 |
| WO | 2009002139 A1 | 12/2008 |
| WO | 2009021068 A1 | 2/2009 |
| WO | 2009058505 A1 | 5/2009 |
| WO | 2009/091553 A1 | 7/2009 |
| WO | 2009151925 A2 | 12/2009 |
| WO | 2011057323 A1 | 5/2011 |
| WO | 2011088233 A1 | 7/2011 |
| WO | 2012106075 A1 | 8/2012 |
| WO | 2012105829 A3 | 9/2012 |
| WO | 2013079512 A1 | 6/2013 |

OTHER PUBLICATIONS

International Civil Aviation Organization, Machine Readable Travel Documents, Part 1, Machine Readable Passports—vol. 2, Passports with Machine Readable Data Stored in Optical Character Recognition Format, Sixth Edition, 131 pages, 2006.

International Civil Aviation Organization, Machine Readable Travel Documents, Part 3, Machine Readable Official Travel Documents—vol. 1, MRtds with Machine Readable Data Stored in Optical Character Recognition Text International Civil Aviation Organization, Third Edition, 122 pages, 2008.

International Civil Aviation Organization, Machine Readable Travel Documents, Part 3, Machine Readable Official Travel Documents—vol. 2, Specifications for Electronically Enabled MRtds with Biometric Identification Capability, Third Edition, 149 pages, 2008.

Dunkel, Jürgen, et al., Model-Driven Architecture for Mobile Applications, pp. 464-477, 2007, Hannover University of Applied Sciences and Arts, Department of Computer Sciences, Hannover Germany.

Glushko, Robert J., et al., Bridging the "Front Stage" and "Back Stage" in Service System Design, pp. 1-10, 2008, University of California, Berkely, School of Information, Proceedings of the 41st Hawaii International Conference on System Sciences, Institute of Electrical and Electronics Engineers (IEEE).

Johnston, Michael, et al., Multimodal Applications from Mobile to Kiosk, 4 pages, AT&T Research, Florham Park, New Jersey, USA, 1975.

Kindervater, Gerard, Revenue Management in the Airline Passenger Industry, 24 pages, AirFrance KLM, 2007.

Li, Quanzhong, et al., XVM: A Bridge Between XML Data and Its Behavior, 9 pages, May 17-22, 2004, 13th International Conference on World Wide Web, New York, New York, USA.

Madria, Sanjay, An XML Schema Integration and Query Mechanism System, pp. 266-303, 2007, Elsevier B.V., Science Direct, Data & Knowledge Engineering 65 (2008).

McGuire, Kelly A., et al., The Future of Revenue Management, 5 pages, 2009, SAS Global Forum 2009, SAS Institute, Inc.

Smith, Barry C., et al., Yield Management at American Airlines, pp. 8-31, 1992, American Airlines Decision Technologies, Dallas/Fort Worth Airport, Texas, USA.

Xu, Liping, et al., A Model of Capacity Control with Overbooking for a Two-leg Airlines Network, 5 pages, 2008, Institute of Electrical and Electronics Engineers (IEEE).

Marmesse, M., et al., Location-aware Information Delivery with comMotion, MIT Media Laboratory, Cambridge, MA, HUC 2000 Proceedings, pp. 157-171, Springer-Verlag.

Chen, G., et al., A Survey of Context-Aware Mobile Computing Research, Dartmouth College, Department of Computer Science, Hanover, New Hampshire, 2000.

Munoz, M., et al., Context-Aware Mobile Communication in Hospitals, IEEE Computer Society, Sep. 2003.

Schwinger, W., et al., Context-Aware in Mobile Tourism Guides—A Comprehensive Survey, Austrian Federal Ministry for Education, Science, and Culture, and the European Social Fund, 2002.

Kinneging, T., Machine Readable Travel Documents—Technical Report: PKI for Machine Readable Travel Documents Offering ICC Read-Only Access, PKI Task Force, International Civil Aviation Organization, Version 1.1, Oct. 1, 2004.

International Search Report and the Written Opinion of the International Search Authority (EPO) for PCT/EP2013/057497 dated Jun. 27, 2013.

Singapore Search Report of Application No. 201306353-2, mailed on Apr. 11, 2014, by the Danish Patent and Trademark Office.

Singapore Written Opinion of Application No. 201306353-2, mailed on Apr. 11, 2014, by the Danish Patent and Trademark Office.

Search Report of Singapore Application No. 201306353-2, received from the Danish Patent and Trademark Office on Jun. 16, 2014.

Written Opinion of Singapore Application No. 201306353-2, received from the Danish Patent and Trademark Office on Jun. 16, 2014.

(56) References Cited

OTHER PUBLICATIONS

International Search Report of Application No. PCT/EP2013/052590, received from the European Patent Office on Jun. 14, 2013.
International Civil Aviation Organization, Machine Readable Travel Documents, Part 1, Machine Readable Passports—vol. 2, Specifications for Electronically Enabled Passports with Biometric Identification Capability, Sixth Edition, 99 pages, 2006.
International Civil Aviation Organization, Machine Readable Travel Documents, Part 3, Machine Readable Official Travel Documents—vol. 1, MRtds with Machine Readable Data Stored in Optical Character Recognition Format, Third Edition, 122 pages, 2008.
Danish Patent and Trademark Office, Written Opinion of Singapore Application No. 201301978-1, dated Oct. 15, 2013.
Hungarian Intellectual Property Office, Search Report of Singapore Application No. 201301980-7, dated Sep. 3, 2013.
Hungarian Intellectual Property Office, Written Opinion of Singapore Application No. 201301980-7, dated Sep. 3, 2013.
Belobaba, Fundamentals of Pricing and Revenue Management, The Global Airline Industry, 2009.
Glaser-Opitz, et al., Evaluation of CPDLC and Voice Communication During Approach Phase, Digital Avionics conference, Sep. 13-17, 2015.
Hull, et al., Technology-Enabled Airborne Spacing and Merging, Digital Avionics Systems Conference, 2004.
International Examination Report mailed in Australian Application No. 2011347893 dated Sep. 11, 2015.
Kenney, et al., Secure ATC Surveillance for Military Applications, Military Communications Conference, 2008.
Lee, et al., Effectiveness of the Ground-Based Transceiver (GBT) Parrot System for Monitoring GPS Integrity for Alaska ATC "Radar-Like Services" Using ADS-B, Digital Avionics Systems Conference, 2004.
AIRCOM Server Administrator Guide, SITA Airline Telecommunications and Information Services, Feb. 19, 2013, pp. 1-280.
AIRCOM Server User Guide, SITA Airline Telecommunications and Information Services, Jan. 24, 2013, pp. 1-153.
Caliendo, et al., Social Networks, Job Search Methods and Reservation Wages: Evidence for Germany, IZA, Sep. 2010, Germany.
Examination Report mailed Apr. 28, 2014 in Malaysian Application No. PI 2013000936.
Examination Report of Malaysian Application No. 2013001405, received from the Intellectual Property Corporation of Malaysia on Oct. 28, 2014.
International Search Report and Written Opinion mailed in International Application No. PCT/EP2011/070551 filed Nov. 21, 2011.
International Search Report and Written Opinion mailed in International Application No. PCT/EP2014/055037 filed Mar. 13, 2014.
International Search Report and Written Opinion mailed in International Application No. PCT/EP2014/062464 filed Jun. 13, 2014.
International Search Report and Written Opinion mailed in International Application No. PCT/EP2015/053319 filed Feb. 17, 2015.
Stellin, "Automation is Considered for Checking IDs in Airports", Business Day, The New York Times, Mar. 19, 2012, 3 pages, retrieved Sep. 4, 2014, http://www.nytimes.com/2012/03/20/business/tsa-is-considering-automating-id-checks.html.
International Search Report mailed in International Application No. PCT/EP2011/072286 filed on Sep. 12, 2011.
Kirby, Personal Services—In-flight connectivity poised to change the passenger experience for ever, http://www.flightglobal.com/news/articles/personal-services-in-flight-connectivity-poised-to-change-the-passenger-experience-for-332765/, Article dated Sep. 28, 2009.
Kitson, The Future of In-flight: Part Two—The Concierge Concept, http://ustwo.com/blog/the-future-of-in-flight-part-two-the-concierge-concept/, Article dated Apr. 2012.
Robert Longley, "TSA's New ID, Boarding Pass Scanning System Draws Criticism", US Government, About.com, Aug. 2, 2012, 2 pages, retrieved online on Jul. 30, 2014, http://usgovinfo.about.com/od/defenseandsecurity/a/Tsa-Boarding-Pass-Scanning-System-Draws-Criticism.
Russian Search Report for 2013133853/08(050668) mailed Feb. 20, 2015.
Schechner, Airlines Entertain Tablet Ideas—Rather Than Wiring Planes for In-Flight Movies, Some Hand Out iPads, http://online.wsj.com/articles/SB10000872396390443916104578020601759253578, Article dated Sep. 2012.
Search Report and Examination Opinion mailed May 19, 2015 in International Application No. GB1421313.6.
Search Report mailed on Aug. 6, 2015 in European patent application No. 15176140.0.

\* cited by examiner

USER PATH DETERMINING SYSTEM AND METHOD THEREFOR

CROSS REFERENCE TO RELATED APPLICATIONS

This application is a non-provisional application and claims the benefit of and priority under 35 U.S.C. §§119, 120 to U.S. Provisional Patent Application Ser. No. 61/596,980, filed Feb. 9, 2012, entitled "Path Determining System & Method Therefor", by Kevin O'Sullivan, et al., and to Great Britain Patent Application No. 1220976.3, filed Nov. 21, 2012, entitled "User Path Determining System and Method Therefor", by Kevin O'Sullivan, et al., the disclosures of which are incorporated herein by reference as if set forth herein in their entireties.

FIELD OF THE INVENTION

This invention relates to a method and system for determining a user's path. Further, this invention also relates to a method and system for determining the location of a user. More specifically, this invention relates to a method and system for tracking a user within an indoor or outdoor area, such as a hospital, a college campus, a sports arena or an airport This invention also relates to a method and system for determining a user's path for operational and planning purposes, and in particular to a method and system for determining the residence time of a user in a zone.

The invention also has application in providing real time information to passengers, as well as to the scheduling of services so that airport authorities can react to any build up of passengers in critical areas such as security screening, immigration checks, baggage and so on.

BACKGROUND OF THE INVENTION

In the past, airports have had difficulty getting historical and real-time information regarding the behaviour of passengers within and around an airport.

One solution to this problem is to use Bluetooth (Bluetooth is a registered trade mark of Bluetooth SIG, Inc, Washington, United States of America) or Radio Frequency Identification (RFID) tags. However these solutions have the following limitations:
  RFID tags are not typically carried by passengers and therefore cannot be used without specifically issuing them to passengers.
  Bluetooth is a short range protocol limited to small areas of the airport.
  Bluetooth is not commonly active in passenger smart telephone devices, thereby limiting the accuracy of any measurements.
  Bluetooth relies on Bluetooth Access Points in fixed locations. It is relatively complex and time consuming to relocate them if necessary.

Another solution is to use a WiFi triangulation method to track passenger smart telephones. WiFi uses a wireless connection between a user device and an access point to transfer data between the user device and access point. WiFi is a registered trade mark of Wi-Fi Alliance, San Jose, United States of America. Usually, the access point has a wired connection to a local area network (LAN). However, a problem with this approach is that WiFi devices do not emit a continuous stream of data. This is because a device will only be detected when a user is actually using the airport WiFi infrastructure.

This means that for any given device, it may be detected only sporadically throughout the airport. For example, a device may be detected while a passenger is using their telephone in a café, or at a gate area, but not while walking from check in to security zones. This is of course problematic for live dwell time measurements because this sporadic data is not representative of what is actually happening in the airport.

Embodiments of the invention seek to address the above problems by using WiFi signals emitted through passenger smart telephones, and other devices, to provide location data which can be used to locate, track and measure the activities of passengers throughout the airport campus. The location data is processed to remove poor quality data and the remaining data is used to determine a passenger's path and associated dwell time information. This data can then be used to provide real time measurements for any section of the airport.

Embodiments of the invention, which may be referred to as and Indoor Anonymous Dwell Time Tracking system, are a multi component service that:
1. Allows airport staff to define arbitrary zones in the airport.
2. Locates devices using triangulation of WiFi signal strength.
3. Associates these devices to a zone in an airport.
4. Charts the path of devices in these spaces.
5. Maintains a live set of continuous device detections for devices detected in the airport
6. Uses this zone and device path data to determine the dwell time in any zones across the airport.

Embodiments of the invention improve on existing RFID systems because the passengers/consumers being tracked do not need to be given a RFID token to carry, and do not necessarily need to be informed that their movements are being tracked, which can subconsciously change behaviour.

Embodiments of the invention improve on Bluetooth systems because WiFi covers the entire airport campus, not just small specific areas. Therefore it is possible to provide sophisticated measurements such as "show current wait time for passengers in immigration who started in international arrivals". It also improves on Bluetooth systems because the zones being measured are arbitrary and are not tied directly to the location of access points. In this regard, in a Bluetooth system, if an airport wants to modify the zone being measured, it is necessary to physically move the Bluetooth sensors. In the present invention, the airport staff just need to configure the new zone using a Google Map application.

Embodiments of the invention improve on basic WiFi triangulation because it can maintain a live device path, storing all the previous zones a device passed through, and use this data to determine if the data is suitable or not for live dwell time measurements.

SUMMARY OF THE INVENTION

According to a first aspect of the present invention, there is provided a system for determining the path taken by a user through one or more zones. The system may comprise: a location server arranged to receive location data indicative of the location of a communication device associated with the user, the location data defining the position of the communication device at a plurality of different points in time, the location server further arranged to receive sequence data associated with the location data indicative of the order in which the location data was determined; and a path determining means for determining the path of the user through the zone, the user's path being defined by at least a portion of the received location data; and a comparator for comparing the determined path of the user with on or more predetermined user paths. The location server processes the received location data depending upon the result of the comparison. Preferably, the location server corrects the determined user path with the process location data.

According to another aspect of the present invention, there is provided a system for processing user location data comprising: a location server arranged to receive location data of a communication device associated with the user, the location data defining the position of the communication device at a plurality of different points in time, the location server further arranged to receive sequence data associated with the location data indicative of the order in which the location data was determined; path determining means for determining the user's path defined by the received location data and the associated sequence data; and a comparator for comparing the determined path of the user with one or more predetermined user paths. Each predetermined path is preferably defined by further location data and associated sequence data indicative of the order of the further location data. The location server is configured to process the received location data depending upon the result of the comparison. Usually, the location data is determined based on signal strength data which is usually received by an access point from a mobile device.

In yet a further aspect of the present invention, a method for processing user location data is provided. The method comprises receiving, with a receiver, location data of a communication device associated with the user, the location data defining the detected position of the communication device at a number of different points in time, and receiving, with the receiver, sequence data associated with the location data indicative of the order in which the location data was determined; determining, using a processor, the user's path passing through points defined by the received location data and the associated sequence data; and comparing, using the processor, the determined path of the user with one or more predetermined user paths; and processing, using the processor, the received location data depending upon the result of the comparison. Preferably, the determined user path is corrected or updated with the processed location data.

BRIEF DESCRIPTION OF THE DRAWINGS

Embodiments of the invention will now be described, by way of example only, and with reference to the accompanying drawings, in which.

The following description is of a system for use in the aviation industry, but this is exemplary and other applications of the invention will also be discussed. For example, the system may be used in any indoor or outdoor area where a user carries a WiFi enabled device, such as a hospital, a college campus, a sports arena and so on.

Figure 1:
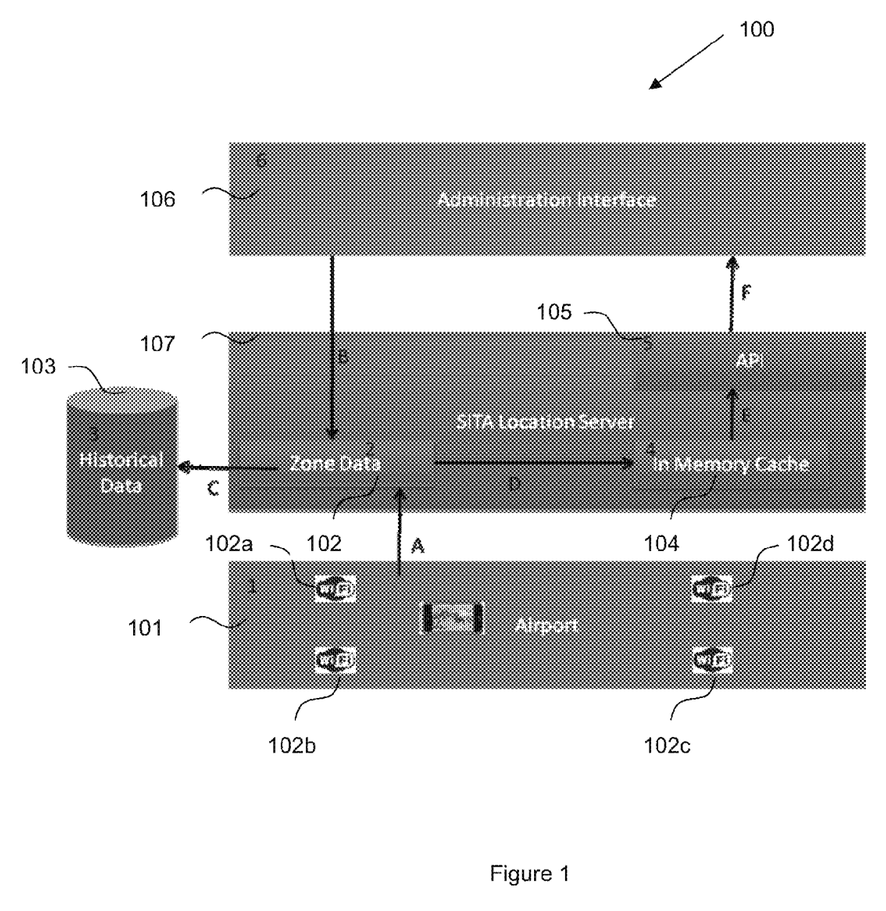
FIG. 1 is a schematic representation of the main functional components embodying the invention.

Referring now to FIG. 1, this shows a schematic representation of a system 100 according to an embodiment of the invention. Operation of the various components will be explained in further detail below.

The system 100 may be directed towards the tracking of users in an airport 101 having a plurality of WiFi access points 101a-101d providing at least part of a WiFi infrastructure in the airport 101. Each access point 101a-101d may be positioned at a different location in the airport 101.

The WiFi infrastructure may use Real-time Locating System (RTLS) triangulation to locate a passenger's smart telephone or other mobile communication device as will be known to the skilled person.

In the embodiment shown in FIG. 1, a location server 107 is communicatively coupled to the airport WiFi infrastructure 101a-101d. The location server 107 may be coupled to the airport infrastructure via a wireless link or a wired link. The sever 107 may run in an airport data centre or as a cloud service over a number of servers, which are usually positioned in different locations.

The server 107 may communicate with the airport network by means of an Application Programming Interface ("API") that is provided by a WiFi vendor or provider. The server 107 may use a particular provider's API to obtain the raw location data from the airport.

The location server 107 may comprise a historical data store 103 for storing the determined movement of devices in the airport. The historical data store may be provided as part of the location server as a hard disk or solid state memory or other local storage means. Alternatively the historical data store 103 may be a separate store located in a different position to the location server 107, such as a hard disk or solid state memory or other remote storage means. The historical data store may store both historical reference data and also data identifying devices belonging to airport staff or infrastructure. In either case, the historical data store 103 is communicatively coupled a zone data component 102 which may be part of the location server 107. This may be using a wired or wireless connection. A zone refers to a spatial area in the airport in which dwell time measurements are to be made. Examples of zones are: Security, Baggage, Immigration, Retail, or Check in.

The zone data component 102 may store a definition of the zones of interest in the airport, for example: airside, landside, security, baggage, retail and so on. The data component 102 may store the zone definitions on a hard disk or solid state memory or in other storage means. The airside part of the airport is usually the part of the airport that is accessible only after a passenger has gone through boarding card and x-ray security checks. The landside part of the airport is usually the part before a passenger has gone through boarding card and x-ray security checks. It is also useful to note that arriving passengers emerges from the baggage hall into the Landside area.

Figure 2:
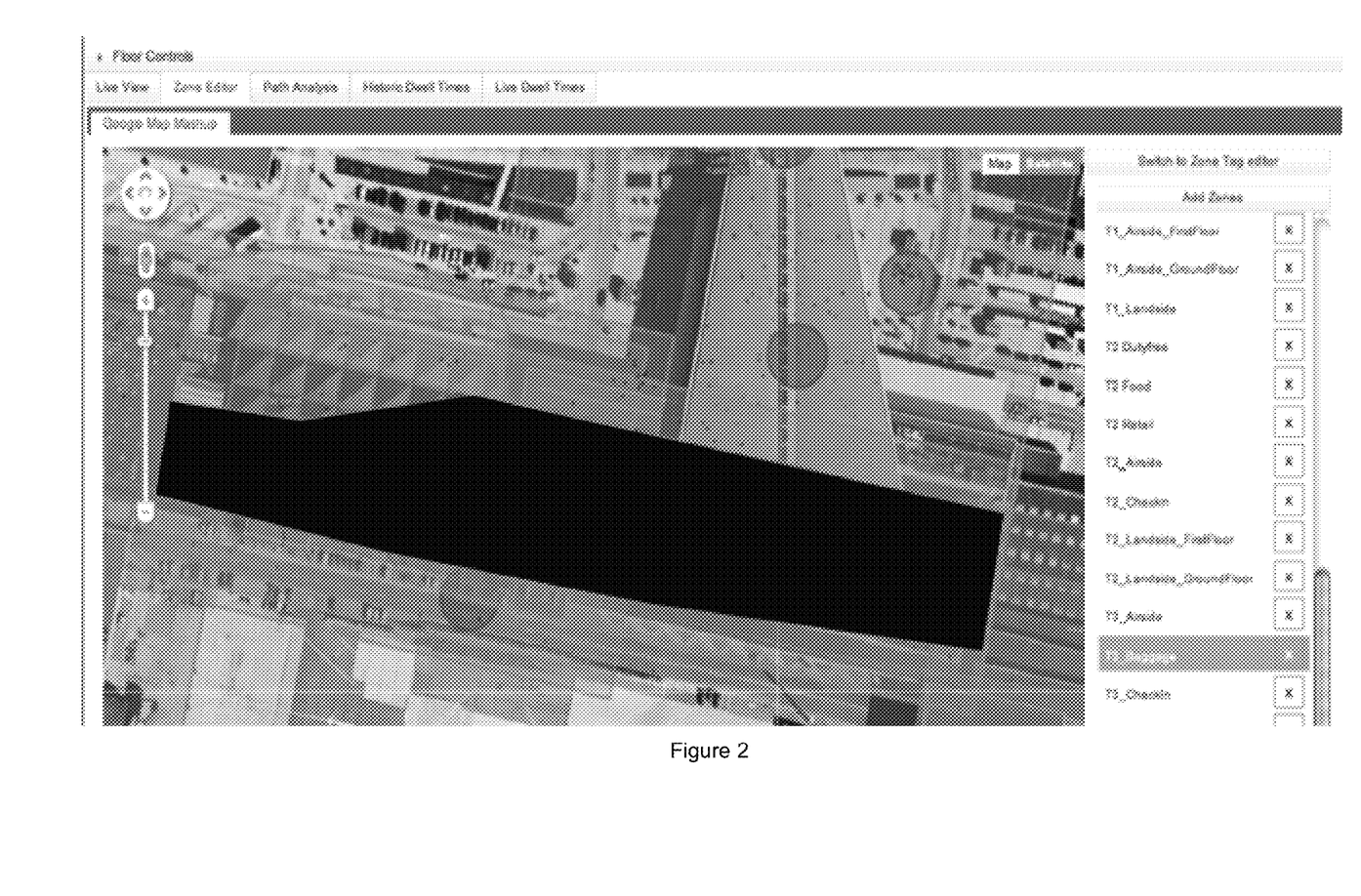
FIG. 2 is a screen shot of a zone editor embodying the invention which may be used to select, create, edit or delete different zones in the airport to track a user's device.

In the example shown in FIG. 2, and described in further detail below, there are three terminals, T1, T2, and T3. Each terminal comprises a plurality of zones. For example, terminal T1 may comprise the following zones: Airside—First Floor, Airside—Ground Floor, and Landside zones. Terminal T2 may comprise Duty Free, Food, Retail, Airside, Check in, Landside-First Floor, and Landside—Ground Floor zones. Further, Terminal T3 may comprise Baggage and Check in zones, although the above definitions of which zones are associated with which terminal are exemplary only.

The zones are defined as are virtual spaces. A user may define each zone by dragging a polygon out on a map application, such as an internet browser map application running on an administration interface 106. One example of a suitable internet browser map application is a Google maps application. Defining a zone is similar to creating a polygon shape in Microsoft Powerpoint. Google is a registered trade mark of Google Inc., USA, and Microsoft and PowerPoint are registered trade mark of Microsoft Corporation, USA.

It is only necessary to define zones in a region of the airport where access points exist. However, one or more physical access points may be added to or removed from a particular zone without modifying the virtual zones. Furthermore, virtual zones may be redefined without having to modify any airport infrastructure. This addresses one of the problems with Bluetooth identified above in that embodiments of the invention may allow a change in the area being measured or monitored without physically moving access points.

In FIG. 1, the arrow labelled B pointing from the administration interface towards the zone data component schematically shows how the administration interface sends data defining a particular zone to the zone data component. The data defining each zone may be data defining a polygon and preferably associated data defining the position of each access point in the polygon.

The server may also comprise an in-memory cache 104. The cache 104 stores data indicative of the current active devices that are being tracked in the airport, including their current position and zone. The cache may also store an in-memory representation of a path a device has taken as it moves thorough the airport. A path may be defined by the curve line or shape which links or joins a sequence of data points indicative of the position of the device. The sequence of the positional data is usually ordered in a chronological order.

Figure 3:
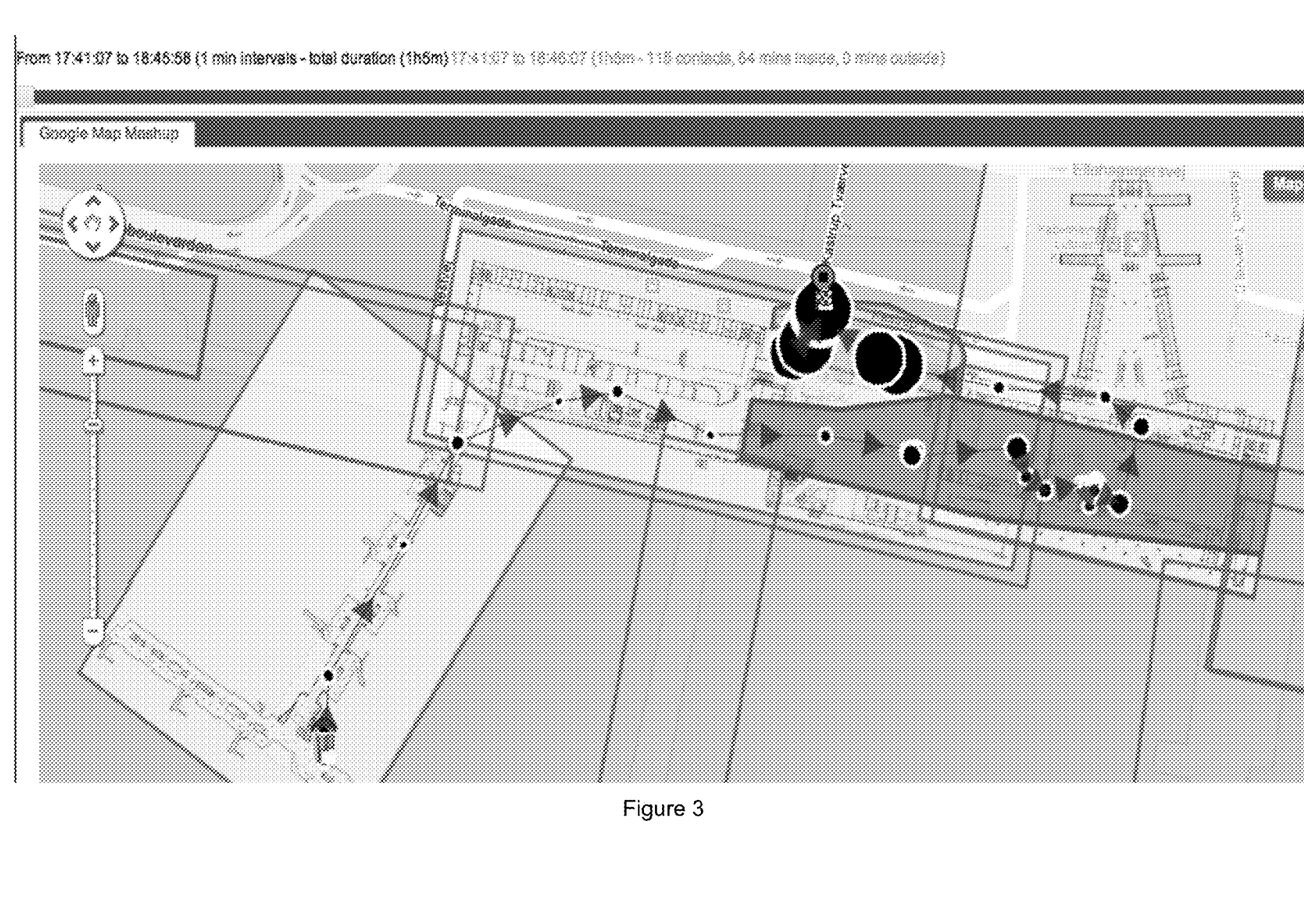
FIG. 3 is a screen shot of an editor embodying the invention in which a high quality device path in the airport is visualised in a particular zone.
Figure 4:
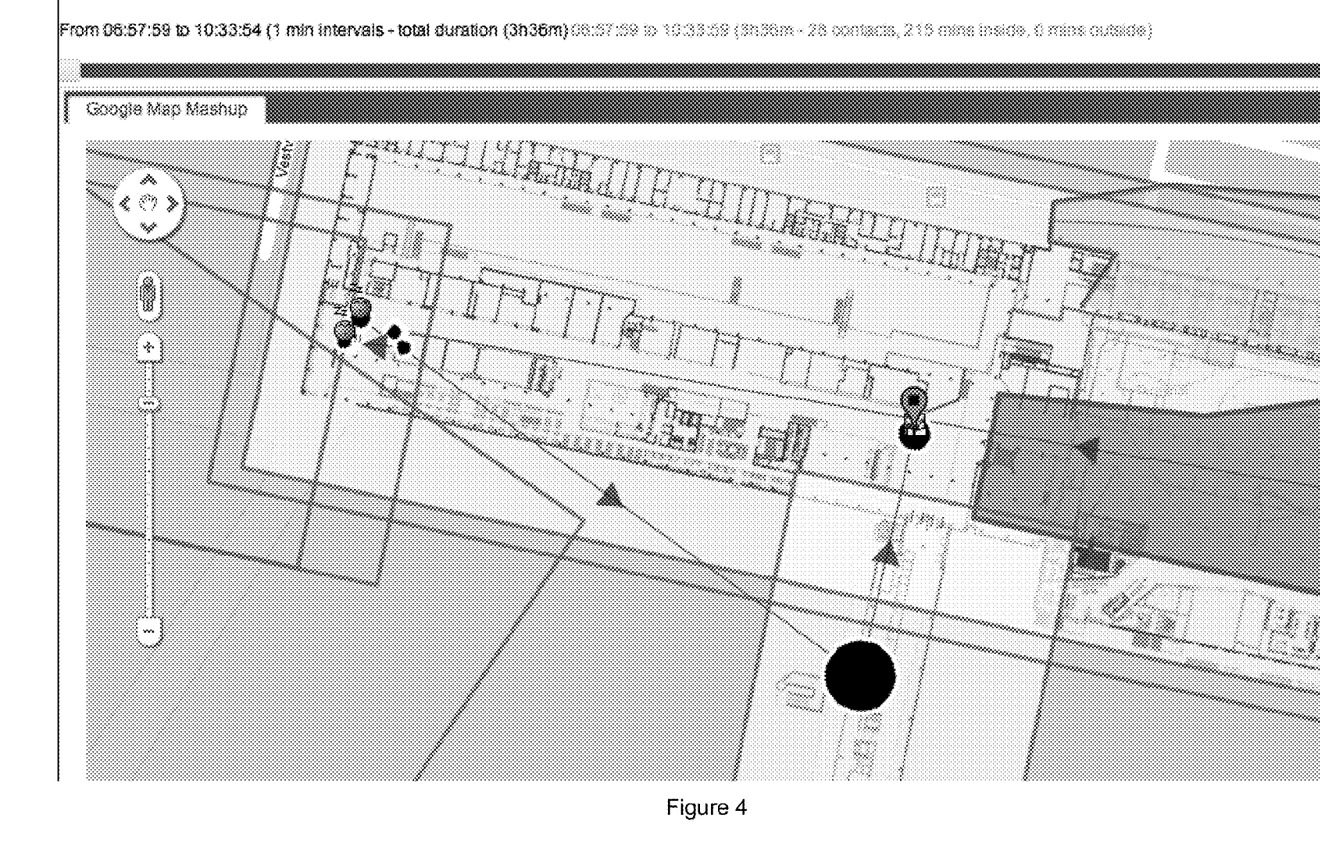
FIG. 4 is a screen shot of an editor embodying the invention in which a lower quality device path in the airport is visualised in a particular zone.

An example of this representation is shown in FIGS. 3 and 4 of the drawings, described in further detail below. FIG. 3 is an example of a device path that is considered a high quality device path. There are plenty of device detections with good accuracy in the desired measurement zone. FIG. 4 is an example of a device path that is considered low quality compared to the device path shown in FIG. 3. There are more infrequent detections than the higher quality device path shown in FIG. 4. The path shown in FIG. 4 is an example of the type of problematic data quality that the invention seeks to address.

The server 107 may also comprise an Application Programming Interface (API) 105. The API provides a way to access the data stored in the in-memory cache 104.

In the embodiment shown in FIG. 1, the API 105 is communicatively coupled to an administration interface 106 and the in-memory cache 104. The administration interface is described in further detail below. Further, the in-memory cache 104 is communicatively coupled to the zone data component 102 and to the API 105. Further, in the embodiment shown in FIG. 1, the zone data component 102 is communicatively coupled to both the historical data store 103 and the airport WiFi infrastructure 101.

The administration interface 106 uses the API 105 to access the memory cache data 104. The administration interface sends a request via the API 105 to access the memory cache data 104. The arrows E and F shown in FIG. 1 represent the memory cache data 104 being sent to the administration interface 106 in response to that request.

As previously described, the system 100 may comprise an administration interface 106 tool. This tool may be used to define the zones and to display the data returned from the API. The administration interface tool 106 is usually provided on a separate or different server to the location server 107 however, they can in principle be provided on a single server. In either case, the administration interface 106 is communicatively coupled to the zone data component 102 and the API 105 within the location server 107.

Figure 6:
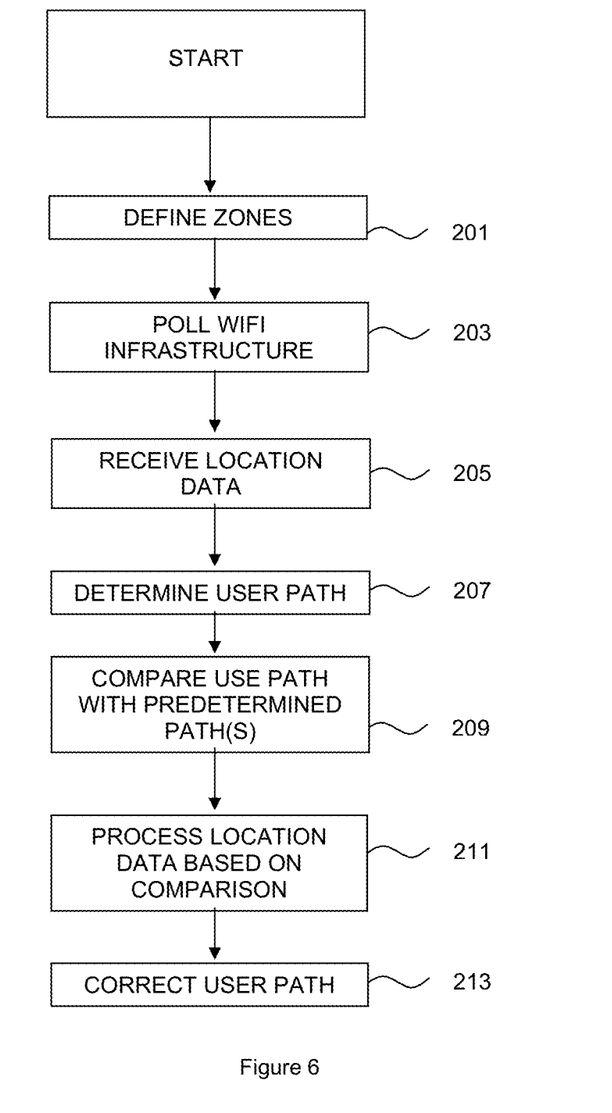
FIG. 6 is a flow diagram showing the main steps performed by an embodiment of the invention.

The various steps performed by an embodiment of the invention will now be described in further detail below, referring to the flow diagram shown in FIG. 6. In some embodiments, not all of the steps shown in FIG. 6 will be performed, and the steps do not necessarily have to be performed in the order shown in FIG. 6.

At step 201, an airport operator uses the Administration Interface 106 to define the zones in the airport. A zone may be defined as a polygon having a plurality of lines joined by a number of vertices. Usually, the polygon is a closed shape so that a user has to cross one of the lines or zone boundary when leaving a zone.

The zone data may be stored in the Zone Data component 102. In addition, the zone data may also be stored offline in the Historical Data Store 103, but it is sufficient for the zone to be stored in a single storage means. An example of a baggage zone is shown in FIG. 2 as a filled black polygon area.

At step 203, the Location Server 107 polls the Airport WiFi infrastructure via a third party server. Usually, the airport WiFi infrastructure is provided by a third party, and therefore the location server 107 polls a third party server which in turn requests data, such as location data associated with all devices which may have moved since the last poll request. Usually, the third party server polls the Airport WiFi infrastructure in a periodic or regular manner. The server may poll the WiFi infrastructure approximately every 15 seconds. However, although the polling may be periodic, the received location data of each device is usually irregular in nature. This is because the airport WiFi infrastructure does not have control as to whether it receives a signal from a device. For example, if a device is temporarily switched off, then no location data of that device will be received by the location server when the device is switched off.

The third party server performs triangulation of the devices as the devices use the WiFi network. The third party server does this by well known triangulation methods familiar to the skilled person. The third party server sends to the location server location data of each mobile device which has been detected by the third party server. This allows the location server 107 to receive data associated with all devices that have moved since the last poll request. The arrow labelled A, shown in FIG. 1 represents this data being sent from the third party location server to the location server 105.

The quality of the data received from the third party server may be determined based on an accuracy value provided by the third party provider. Data quality may be determined based on the signal strength or, the number of access points which can see each device, or both.

In addition, the location data may be time-stamped. This provides additional data indicative of when the location data of a particular device was determined. The system may determine the frequency of detections by comparing the time stamp of sequential location data messages received by the location sever 107.

The third party server then sends raw, or in other words, unprocessed location data to the location server 107. The unprocessed location data may include absolute positional data of each device i.e. longitude and latitude of each device in an airport or in other words, the x and y coordinates of the devices. Usually, the received location data of each device does not depend upon the location of the access point which each device is communicating with. Accordingly, the received location data of each device may be independent of the position of each access point.

At step 205, the location server 105 receives from the third party triangulation server data determining the location of all mobile devices which are active within the airport. This may be performed every 15 seconds, but can be performed more frequently or less frequently than this. After the server has received the location data at step 205, the location server may determine the user's path defined by the received location data and the associated sequence data defining a plurality of points on the path, at step 207. At step 209, the location server compares the determined path of the user with one or more predetermined user paths. At step 211, the location server processes the received location data depending upon the result of the comparison. At step 213, the location server corrects or updates the determined user path based on the comparison.

In some embodiments, the raw data received by the location server 107 may be combined or associated with the Zone Data to give it context. This is done by determining whether or not each device is within the boundary defining a particular zone. If it is determined that a particular device is located in a particular zone, then the location data associated with that device is also associated with the zone in which the device is located.

For example, the location server 107 may compare the location data, i.e., the coordinates of a device with the coordinates defining a zone. If a device is determined to be inside the boundary of a polygon defining the zone under consideration, then the location server 107 associates that zone with the data structure for each device.

The combined or associated data may be referred to as contextual data. The data is combined by the server 107 and then stored in an in-memory (and preferably database) data structure. There is a data structure for each device detected. This data structure contains the coordinates, for example the abscissa (e.g. x coordinate) and ordinate (e.g. y coordinate) of the device.

In other words, each device is associated with a zone at each detected location. Usually, a plurality of devices are associated with each zone. In the example shown in FIG. 3, there are 5522 device paths are found, ready for an operator to review.

For example, there may be many people waiting in security or baggage zones at peak time. If there are 100 people waiting, and the server receives data detecting around 10% of them, then there would be 10 devices active in security or baggage.

Although not essential to all embodiments, the contextual location data may be stored in the Historical Data Store 103.

The contextual location data may also be updated in the In Memory Cache 104, storing a real time representation of the movements of all devices in the airport, as shown in FIG. 3.

The contextual data may be stored in both store 103 and memory cache 104 so that a) any airport staff may be automatically identified during nightly processing because they are in the airport longer than is typical for passengers, and b) so that the airport can use the data for historical comparison.

Each time the data is polled, the live dwell time may be determined for each device within each zones. This is described in further detail with reference to a particular Live Dwell Time Algorithm below.

Figure 5:
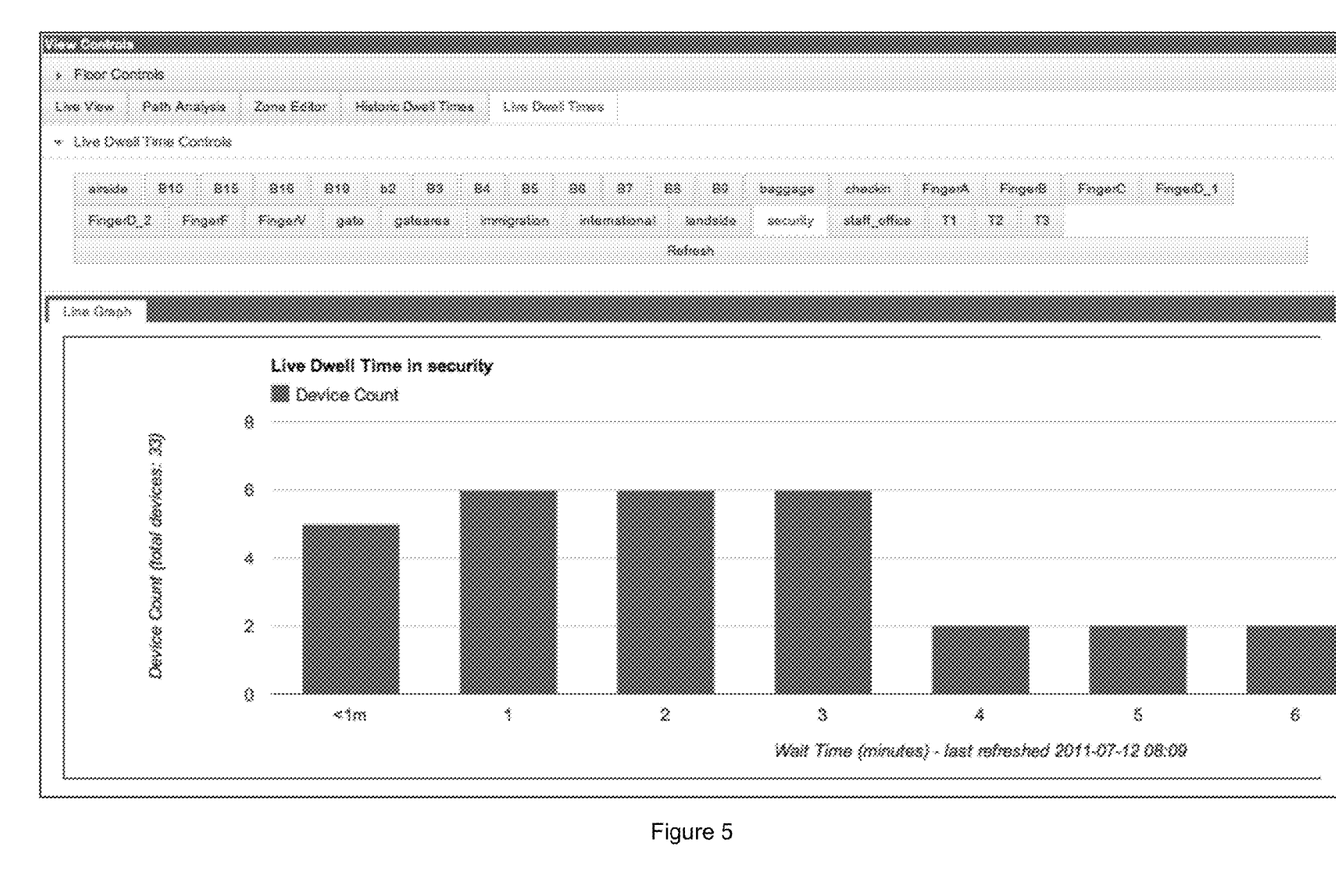
FIG. 5 is a histogram showing live dwell time data obtained by embodiments of the invention.

For each communication device, the dwell time may be determined by determining the time when a user was first detected within a zone, and the time when the user was last detected within a zone (before the user moved do a different zone). The dwell time may be computed as the difference in time between the last detection time within a zone and the first detection time within a zone. In the histogram shown in FIG. 5, the number of devices within security is determined as function of wait or dwell time: 5 devices have a dwell time of less than one minute; 6 devices have a dwell time of 1 minute; a further 6 devices have a dwell time of 2 minutes; a further 6 devices have a dwell time of 3 minutes; 2 devices have a dwell time of 4 minutes; 2 further devices have a dwell time of 5 minutes; while finally, 2 devices have been determined to have a dwell time of 6 minutes in security. Steps 203, 205, 207, 209, 211, and 213 may be repeated as updated location data is received by the location server 107.

The dwell time is the amount of time that passengers spend in a particular area (i.e., a Zone) of the airport. This term is interchangeable with Wait Time. Dwell Time is used in areas of an airport that a passenger wants to be in for example retail, food hall. Wait Time is used in areas of an airport that a passenger doesn't want to be in, for example check in, security, baggage collection.

The data may be made accessible to 3rd parties via the API. In other words, $3^{rd}$ parties may access the data stored in the historical data store 103 (and the in memory cache 104). This live data is in stored in memory 104, while the historic data is stored in historical data store 103. The data (both real time or historical or both) may be viewed using the Administration Interface 106, as shown in FIG. 4, although this step is in fact optional.

The processing, using an algorithm, of the raw WiFi positional data of each mobile device within the airport will now be described in further detail. The algorithm uses the received positional data to determine live dwell time of each mobile device within the airport. This algorithm may be performed every time the location server 107 refreshes the location of devices in the Airport.

When measuring the live dwell time for a given zone such as security, it is necessary to factor in the following data quality problems:
1. Staff and static WiFi devices (e.g., staff personal computers (PCs)) in the security should be filtered out.
2. The sporadic and periodically inaccurate nature of WiFi data means that devices that are passing near to, but not through, the Security zone may be incorrectly reported as being in Security.
3. The number, accuracy and frequency of detections will vary for devices.

Embodiments of the invention address these data quality problems in a number of different ways.

Handling Staff Devices

The Location Server 107 maintains a dynamic list of staff and infrastructure at the airport (Historic Data 103 above). This list is automatically generated by monitoring for devices that are in the airport for a long time which may be typical of a staff member working there, or are frequently in the airport which may be typical of airport staff working 5 days a week.

Devices in the Security zone are then compared with this list and filtered out from the results.

Handling Inaccurate or Partial Paths

Inaccurate WiFi data can be smoothed out or eliminated by using the typical path of a departing passenger through the airport. The following example refers to a departing passenger because it is described in conjunction with a security area, and only departing passengers pass through security. Nevertheless, the processing steps equally apply to other passenger types such as arriving passengers.

The device path can be used to profile the passenger as a Departing, Arriving or Transfer passenger. In addition the device path can be profiled as Airport Staff, or a welcoming agent also known as a Meeter/Greeter.

The typical path of a departing passenger is given by the following sequence of zones:

| LANDSIDE | CHECK IN | SECURITY | AIRSIDE | RETAIL | GATE AREA |
|---|---|---|---|---|---|

That is, a passenger arrives at the airport in the LANDSIDE zone, then CHECKS IN, then passes through SECURITY to the AIRSIDE zone. The passenger will typically dwell in the RETAIL area until ready for boarding and then go to the GATE AREA. For the purposes of measuring dwell time in security, any paths that contain LANDSIDE or CHECKIN in the past, and do not contain AIRSIDE/RETAIL/GATEAREA can be considered good representative paths.

Examples of inaccurate paths caused by the sporadic nature of the WiFi data are:

| 1. | SECURITY | [SLEEP] | GATE AREA |
|---|---|---|---|

This would be an example of a path where a device is first detected in the SECURITY area, then enters SLEEP mode where it is no longer detected by the WiFi infrastructure, and after a long period of time detected in GATEAREA. This is a bad path because a) It is not known how long the device was in SECURITY before it was first detected and b) because it entered a SLEEP mode and was undetected, it is not known how long it remained there before going AIRSIDE.

| 1. | AIRSIDE | GATE AREA | BAGGAGE | SECURITY | LANDSIDE |
|---|---|---|---|---|---|

This is an example of an arriving passenger who has arrived at AIRSIDE in the GATEAREA, and walked to BAGGAGE to collect their bags. Before going LANDSIDE, the passenger is briefly (and incorrectly) detected in the SECURITY zone because of poor WiFi quality. This device path will therefore have to be eliminated from the dwell time measurements.

Because the full device path is maintained in memory, it is possible to filter or remove these bad quality paths by specifying filter criteria in the algorithm. The filter criteria vary according to the zone being measured, and therefore must be configurable for the zone in question. The following is an example of the filter criteria for two zones:

1. Security Zone
a. Device must be in Security Zone, or device must have just transitioned out of Security into AIRSIDE
b. Device must never have been AIRSIDE
c. Device must have previously been LANDSIDE
d. Device path must match profile for Departing Passenger 2. Baggage Zone
a. Device must be in Baggage Zone, or device must have just transitioned out of Baggage into LANDSIDE
b. Device must never have been LANDSIDE
c. Device must have previously been AIRSIDE
d. Device path must match profile for Arriving Passenger Handling Number, Accuracy & Frequency of Detections The live dwell time algorithm may factor in the number, accuracy & frequency of detections to determine the quality of any given device path for use. These three factors are important because:

1. In general, the more detections that of a particular device path, the better quality of that device path. Closely related to this is the accuracy and frequency of these detections.
2. The accuracy can vary from detection to detection, caused by environmental factors at the airport. The higher the accuracy, the more reliable the data.
3. The frequency of detections varies along the device path (typically due to whether the passenger is using the device or not). Infrequent detections is a problem because if a device has not been detected for, say 2 minutes, it is not possible to tell if the device is still in Security or has moved out of Security. FIGS. 2 and 3 show examples of device paths with high and low frequency.

The algorithm factors in these three parameters when assigning a quality value to the path. Of particular importance are the frequency and accuracy of detections as the device transitions from CHECKIN to SECURITY and from SECURITY to AIRSIDE. If a determination can be made with a high degree of accuracy when a device moves into/out of SECURITY, then embodiments of the invention can determine with a high degree of accuracy how long the device spent in SECURITY.

The device path has to meet a quality threshold to be usable for zone dwell time measurement.

Accordingly, embodiments of the invention combine an arbitrary zone definition, device path profiling, device path filtering by history and device detection quality profiling such that that the variable and sporadic nature of WiFi signals can be processed. This allows live (as well as historic) dwell times of a user in any part of an airport to be determined.

The invention claimed is:

1. A system for determining a user's path comprising:
   a. a location server arranged to receive location data of a communication device associated with the user, the location data defining the detected position of the communication device at a number of different points in time, the location server further arranged to receive sequence data associated with the location data indicative of the order in which the location data was determined;
   wherein the location server is further arranged to compare the received location data and zone data defining a plurality of zones and to associate the received location data with one of the plurality of zones;
   b. path determining means for determining the user's path passing through a sequence of zones defined by the associated location data and the associated sequence data;
   c. storage means for storing a plurality of pre-generated, predetermined user profiles wherein each pre-generated, predetermined user profile is defined by zone sequence data defining an order in which a given type of user passes through the plurality of zones; and d. a comparator for comparing the determined path of the user passing through the sequence of zones with one or more pre-generated, predetermined user profiles;
wherein the location server is further arranged to associate the user with a given pre-generated, predetermined user profile and to process and correct the previously determined path of the user depending upon the result of the comparison by, at least in part, eliminating inaccurate location data.

2. A system according to claim 1 in which the location server is further configured to smoothen the determined path or eliminate one or more points on the determined path or interpolate between points on the path based on the result of the comparison.

3. A system according to claim 1 in which the location server is further configured to determine the accuracy of the associated location data based on the result of the comparison.

4. A system according to claim 1 in which the location server is further arranged to track the location of user at a point in time on the path based on real time or cached location data.

5. A system according to claim 1 in which the location server is configured to receive location data comprising timestamp data indicative of when the location of the device was determined.

6. A system according to claim 1 in which the location server is further configured to determine the user's dwell time at a particular location or within a zone based on the processed associated location data.

7. A system according to claim 6 in which the location server determines that the device is associated with a staff member if the determined dwell time is greater than a predetermined threshold.

8. A system according to claim 1 in which the location server is further configured to determine the number of points on the determined user path, and preferably to compare the determined number of points with a predetermined threshold stored in a storage means.

9. A system according to claim 8 in which the location server is further configured to determine the user dwell time only if the number points on the determined user path is greater than the predetermined threshold.

10. A system according to claim 1 in which the location server is configured to process the associated location data to eliminate location data associated with an inaccurate path.

11. A system according to claim 1 in which the location server is further configured to determine that a path is inaccurate if the determined user path does not correspond to the predetermined user path.

12. A system according to claim 1 in which the location server is further configured to determine whether the communication device is associated with a staff member or infrastructure located within a zone or whether the communication device is stationary for a substantial period of time.

13. A system according to claim 1 in which the location server is further configured to process the location data to eliminate location data associated with a staff member or infrastructure or location data of a device which has been stationary for a substantial period of time.

14. A system according to claim 1 wherein the storage means is configured to store a departing passenger profile or an arriving passenger profile or a transfer passenger profile or an airport staff profile, or welcoming staff profile or non-passenger user profile.

15. A system according to claim 1 further comprising an administration interface for defining a plurality of zones within a region such as an airport.

16. A system according to claim 1 in which the location server is further configured to determine zone data, from the received location data, indicative of which of a plurality of zones the communication device is located in at each point in time.

17. A system according to claim 16 in which the location server is further configured to associate the determined zone data with the determined location data.

18. A system according to claim 1 in which the location server is further configured to profile the user as a departing passenger or an arriving passenger or a transfer passenger or airport staff, or welcoming staff or non-passenger user based on the comparison of the determined user path and the predetermined user path.

19. A system according to claim 1 in which the location server is further configured to rank the determined user path data based on the number of points which the determined user path passes through or based on the accuracy of the processed associated location data or based on the frequency of the processed location data.

20. A system according to claim 1 in which the location server is further configured to determine a boundary of one or more zones.

21. A system according to claim 1 in which the location server is further configured to determine a first frequency of location detections when the user device is within a first predetermined distance from a zone boundary and a second frequency of location detections when the user device is further away from the zone boundary.

22. A system according to claim 21 in which the location server is further configured to rank the path based on the first and second frequency of detections.

23. A system according to claim 1 in which the location server is further configured to receive location data of a plurality of communication devices, to compare the received location data and the received zone data and, if it is determined that the received location data is in a given zone, to produce associated location data associating the received location data with the given zone and to determine the path of each device and to compare the determined path of each user with one or more predetermined user paths and to process the associated location data depending upon the result of the comparison and to correct each determined user path with the processed associated location data depending upon the result of the comparison.

24. A system according to claim 1 in which the location server is further configured to determine a first frequency of location detections of a first path when the user device is within a first predetermined distance of a zone boundary and a second frequency of location detections of a second path when a further user is within a corresponding predetermined distance from the zone boundary.

25. A system according to claim 24 in which the location server ranks a path with more location detections within the predetermined distance of a zone boundary higher than a path with fewer location detections within the predetermined distance of the zone boundary.

26. A system according to claim 1 further comprising storing means for storing the determined user path.

27. A system according to claim 1 in which the location data of the communication device is determined based on signal strength data received by an access point.

28. A system according to claim 1 in which the location data is received from a third party server arranged to determine the location of the communication device based on signal strength data received by the third party server.

29. A system according to claim 1 wherein the received location data comprises location data defining the detected position of the device at three or more points in time, and wherein the location data is received in a non-periodic or irregular or sporadic manner.

30. A system according to claim 1 in which the location data is determined using a wireless communications system, particularly a wireless communications system employing a wireless protocol according to the Institute of Engineering and technology 802.11 standard.

31. A system according to claim 1 wherein each predetermined path is defined by further location data and associated sequence data indicative of the order of the further location data.

32. A system according to claim 1 wherein the location server is further arranged to process and to correct the determined user path depending upon zone filter criteria.

33. A system according to claim 1 wherein the zone data further defines a plurality of zones corresponding to defined spatial locations.

34. A system for processing user location data comprising:
   a. a location server arranged to receive location data of a communication device associated with the user, the location data defining the detected position of the communication device at a number of different points in time, the location server further arranged to receive sequence data associated with the location data indicative of the order in which the location data was determined and to receive zone data defining a plurality of zones; wherein the location server is further arranged to compare the received location data and the received zone data and, if it is determined that the received location data is in a given zone, to produce associated location data associating the received location data with the given zone;
   b. path determining means for determining the user's path passing through a sequence of zones defined by the associated location data and the associated sequence data;
   c. storage means for storing a plurality of pre-generated, predetermined user profiles wherein each pre-generated, predetermined user profile is defined by zone sequence data defining an order in which a given type of user passes through the plurality of zones; and
   d. a comparator for comparing the determined path of the user passing through the sequence of zones with one or more pre-generated, predetermined user profiles;
   wherein the location server is further arranged to associate the user with a given pre-generated, predetermined user profile and to process the previously determined user path depending upon the result of the comparison by, at least in part, eliminating inaccurate location data.

35. A method for determining a user's path comprising:
   a. receiving with a location server location data of a communication device associated with the user, the location data defining the detected position of the communication device at a number of different points in time, receiving, using the location server, sequence data associated with the location data indicative of the order in which the location data was determined and receiving zone data defining a plurality of zones; further comprising comparing, with the location server, the received location data and the received zone data and, if it is determined that the received location data is in a given zone, producing associated location data associating the received location data with the given zone;
   b. determining with a path determining means, the user's path passing through a sequence of zones defined by the associated location data and the associated sequence data;
   c. storing, using a store, a plurality of pre-generated, predetermined user profiles wherein each pre-generated, predetermined user profile is defined by zone sequence data defining an order in which a given type of user passes through the plurality of zones; and
   d. comparing, using a comparator, the determined path of the user passing through the sequence of zones with one or more pre-generated, predetermined user profiles; and
   associating the user with a given pre-generated, predetermined user profile and processing and correcting with the location server the previously determined user path depending upon the result of the comparison by, at least in part, eliminating inaccurate location data.

36. A method for processing user location data comprising:
   a. receiving, with a receiver, location data of a communication device associated with the user, the location data defining the detected position of the communication device at a number of different points in time, and receiving, with the receiver, sequence data associated with the location data indicative of the order in which the location data was determined and receiving zone data defining a plurality of zones; further comprising comparing, with the location server, the received location data and the received zone data and, if it is determined that the received location data is in a given zone, producing associated location data associating the received location data with the given zone;
   b. determining, using a processor, the user's path passing through a sequence of zones defined by the associated location data and the associated sequence data;
   c. storing, using a store, a plurality of pre-generated, predetermined user profiles wherein each pre-generated, predetermined user profile is defined by zone sequence data defining an order in which a given type of user passes through the plurality of zones; and
   d. comparing, using the processor, the determined path of the user passing through the sequence of zones with one or more pre-generated, predetermined user profiles; and
   associating, using the processor, the user with a given pre-generated, predetermined user profile and processing, using the processor, the previously determined user path depending upon the result of the comparison by, at least in part, eliminating inaccurate location data.

* * * * *